No. 635,987. Patented Oct. 31, 1899.
N. W. VANDEGRIFT.
THREAD CUTTING TOOL.
(Application filed Jan. 13, 1899.)

(No Model.)

WITNESSES

INVENTOR
Nathaniel W. Vandegrift

UNITED STATES PATENT OFFICE.

NATHANIEL W. VANDEGRIFT, OF BRIDGEPORT, CONNECTICUT, ASSIGNOR TO THE ARMSTRONG MANUFACTURING COMPANY, OF SAME PLACE.

THREAD-CUTTING TOOL.

SPECIFICATION forming part of Letters Patent No. 635,987, dated October 31, 1899.

Application filed January 13, 1899. Serial No. 702,087. (No model.)

*To all whom it may concern:*

Be it known that I, NATHANIEL W. VANDEGRIFT, a citizen of the United States, residing at Bridgeport, county of Fairfield, State of Connecticut, have invented a new and useful Thread-Cutting Tool, of which the following is a specification.

My invention has for its object to produce a thread-cutting tool that will cut either a straight or tapering thread of any length during a single revolution of the article to be threaded.

With this end in view I have devised the simple and novel thread-cutting tool which I will now describe, referring by letters and numbers to the accompanying drawings, forming part of this specification, in which—

Figure 1:
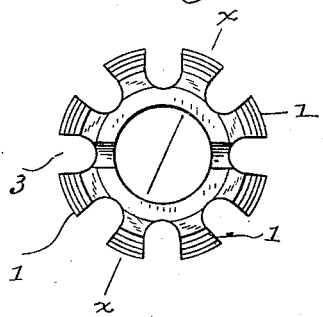
Figure 2:
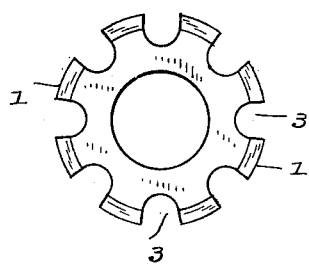
Figure 3:
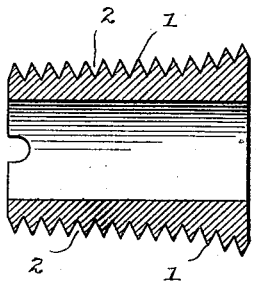

Figures 1 and 2 are reverse end elevations of one form of my novel thread-cutting tool, and Fig. 3 is a section on the line $x$ $x$ in Fig. 1, the tool illustrated being a form especially adapted for cutting threads upon pipe-threading dies, the tool therefore, in addition to a taper which adapts the die to impart a slight taper to the threaded end of the pipe, being provided with an additional taper, which gives what is termed the "starting" taper at the end of the die. It should be understood, however, that the principle of my invention may be applied to the cutting of taps or any external thread as well as the internal thread of a thread-cutting die.

The body of my novel thread-cutting tool may be made solid or may consist of any number of pieces or rings secured together in any suitable manner. It may be of cylindrical, conical, or cylindroconical form and may be of any suitable length, depending upon the length of the longest article upon which it may be required to be used, it being preferable that the tool be slightly longer than the longest article upon which it may be required to operate.

The essential feature of construction is that the external surface of the body consists of a series of alternate circular ridges and depressions—*i. e.*, a series of circular rings as distinguished from a spiral ridge, the circular ridges being indicated by 1 and the circular depressions by 2. The apexes of the ridges and the bases of the depressions are an exact distance apart corresponding with the pitch of the thread which it is desired to cut. For example, if it be desired to produce what is termed an "eleven-and-a-half thread"—that is, a thread consisting of eleven and one-half ridges and depressions to the inch—the apexes of the respective ridges and the bases of the respective depressions will be two twenty-thirds of an inch apart. 3 denotes longitudinal grooves, which intersect the ridges and depressions, and thereby form cutting-points upon the circular ridges. Any number of these grooves may be used, the number of grooves and their size and depth not being of the essence of my invention.

In use the tool is placed upon a mandrel and rigidly secured in place, the mandrel not being shown, as it forms no portion of my invention. The mandrel and the tool are rotated at a high rate of speed. The article to be threaded is firmly secured in a suitable head or carrier, which is slowly rotated, preferably in the opposite direction from the tool. Either the tool or the article being threaded is given a slight longitudinal movement relative to the other a distance corresponding to the pitch of the thread, the article to be threaded meanwhile being held in contact with the threading-tool. As before stated, the tool rotates rapidly and the article very slowly. Therefore there is no side drag during the cutting of the threads because the longitudinal movement is very slow relative to the circular movement, thus practically eliminating any side drag. The result is the cutting of a complete thread on the article during a single revolution of said article.

It will be obvious that in cutting inside work—for example, in threading dies—the cutter must be smaller for the work, so that the cutting-points will clear. In cutting outside work—for example, in threading a rod— the relative size of the work and the cutter within reasonable limits is immaterial. As above stated, the tool is formed with a slight or gradual taper for a portion of its length from the smaller end and with an additional or increasing taper therefrom to the other end. In other words, the tool is provided with a double taper, it being shown in Fig. 3 as tapering substantially uniformly from the end $a$ to the point at about b, and from the latter point to the end c the said tool tapers more abruptly, the end c being the larger end. Therefore about the first ten ridges, counting from left to right, form the threads of the die which produces the standard pipe taper, while the remaining ridges, say from b to c, form the threads in the die which imparts what is called the "starting" taper, the whole forming a die adapted to receive, draw in, and thread pipes no matter how blunt or rough the ends may be. In other words, the tool, as shown in Fig. 3, is adapted to form the threads in a pipe-threading die during a single rotation of the latter and without requiring any lateral feed of either the tool or the article, so as to enable the tool to properly taper the die.

Having thus described my invention, I claim—

A tool for cutting threads comprising a body the outer surface of which consists of a series of alternate ridges and depressions, the apexes of the respective ridges and the bases of the respective depressions being a distance apart corresponding with the pitch of the thread which it is desired to cut, and being intersected by a series of longitudinal grooves whereby cutting-points are formed, the said tool being gradually and uniformly tapered for a portion of its length and differently or more abruptly tapered for the remainder of its length.

In testimony whereof I affix my signature in presence of two witnesses.

NATHANIEL W. VANDEGRIFT.

Witnesses:
A. M. WOOSTER,
J. F. CRUDGINTON.